United States Patent [19]
Badillo

[11] Patent Number: 6,131,026
[45] Date of Patent: Oct. 10, 2000

[54] RELEASE RESOURCE MESSAGE TRANSMISSION FOR UNSUPPORTED CALLING SERVICE CALLS

[75] Inventor: Eduardo Teodoro Sanchez Badillo, Saltillo, Mexico

[73] Assignee: Telefonaktiebolaget L M Ericsson (publ), Stockholm, Sweden

[21] Appl. No.: 08/985,886

[22] Filed: Dec. 5, 1997

[51] Int. Cl.[7] ................................................ H04Q 7/20
[52] U.S. Cl. .................... 455/428; 455/445; 455/432; 455/422
[58] Field of Search ................................. 455/422, 433, 455/432, 436, 560, 414, 445, 458, 515, 428; 370/329, 330, 336, 337, 343, 344, 347, 348, 443; 379/93.02

[56] References Cited

U.S. PATENT DOCUMENTS

| | | | |
|---|---|---|---|
| 5,400,390 | 3/1995 | Salin | 379/59 |
| 5,504,804 | 4/1996 | Widmark et al. | 379/63 |
| 5,523,997 | 6/1996 | Bishop, Jr. | 370/54 |
| 5,564,068 | 10/1996 | Nguyen | 455/33.1 |
| 5,661,724 | 8/1997 | Chennakeshu et al. | 370/324 |
| 5,711,006 | 1/1998 | Brochu et al. | 455/455 |
| 5,857,153 | 1/1999 | Lupien | 455/422 |
| 5,884,164 | 3/1999 | Gerard et al. | 455/428 |
| 5,918,177 | 6/1999 | Corriveau et al. | 455/432 |

OTHER PUBLICATIONS

U.S. application No. 08/985,886, Lupien et al., filed Jan. 5, 1999.

M. Mouly, et al., "The GSM System for Mobile Communications", 1992, pp. 409–420.

*Primary Examiner*—Fan Tsang
*Assistant Examiner*—Blane J. Jackson
*Attorney, Agent, or Firm*—Jenkens & Gilchrist, P.C.

[57] ABSTRACT

In response to gateway switching node reception of an incoming call dialed to a certain mobile station and implicating a certain calling service, the gateway switching node queries a home location register for location information on the called mobile station. The home location register then contacts a currently believed serving visited switching node for routing information. The visited switching node and its satellite switching node(s) then poll for the called mobile station. Responsive to a successful poling for the mobile station by the satellite switching node, a communications resource is reserved to handle delivery of the incoming call implicating the certain calling service. If, however, the satellite switching node does not support the implicated calling service, this is detected by the visited switching node and the incoming call is disconnected. A release reserved resources message is then sent to the satellite switching node. The reserved communications resource is then released for use in connection with other call deliveries.

9 Claims, 2 Drawing Sheets

RELEASE RESOURCE MESSAGE TRANSMISSION FOR UNSUPPORTED CALLING SERVICE CALLS

CROSS REFERENCE TO RELATED APPLICATION

This application for patent is related to commonly assigned, co-pending application f or patent Ser. No. 08/510,972, entitled "System and Method for Addressing a Release Resource Message" filed Aug. 3, 1995, by J. Brochu, et al.

BACKGROUND OF THE INVENTION

1. Technical Field of the Invention

The present invention relates to cellular communications systems and, in particular, to the transmission of a message instructing a switching node to release a previously allocated and reserved communications resource.

2. Description of Related Art

When an incoming call (voice, data or fax) is dialed to a mobile station, the cellular communications system responds by attempting to locate the mobile station using a paging process. In particular, a visited switching node (also referred to as the visited mobile switching center (V-MSC)) believed to be currently serving the called mobile station has one or more of its base stations broadcast paging messages over the air interface. These paging messages are addressed for the called mobile station. If this paging is unsuccessful, other neighboring switching nodes may also make paging broadcasts. If the mobile station responds to any one of the broadcast pages, it has been located, and a communications resource (comprising a traffic channel) over the air interface is reserved to handle delivery of the incoming call. The mobile station is further marked by the communications system as being busy. The cellular communications system then routes (through-connects) the incoming call to the serving switching node for delivery over the reserved communications resource to the called mobile station. Once the incoming call is routed to the serving switching node, a call alert notification (typically comprising a ring) is provided to the subscriber.

While the call is being delivered by the communications system implementing such a page before routing procedure, the mobile station remains connected to the reserved resource. This call routing process may take a time period of several seconds to complete. During this time period, the communications resource remains engaged (i.e., reserved) solely for the use of the called mobile station, and is thus not available for use by other mobile stations. Furthermore, during the routing time, the subscriber owning the mobile station cannot either make or receive another call. In this regard, it should be remembered that although the communications system is aware of the incoming call to the mobile station, the subscriber owning that mobile station has not yet been notified (through, for example, a call alert or other message) that an incoming call is being through-connected for delivery over the reserved resource.

In many instances, delivery of the incoming call to the mobile station fails even though the paging process successfully located the mobile station. For example, the calling party may drop the call before the delivery to serving switching node is completed. In commonly assigned, co-pending application for patent Ser. No. 08/510,972, entitled "System and Method for Addressing a Release Resource Message" filed Aug. 3, 1995 (the disclosure of which is hereby incorporated by reference), a release resource message is sent to the visited switching node when the calling party drops the call or access is denied to the called mobile station before call delivery is completed. This allows the reserved resource to be made available to other mobile stations in connection with performing a call delivery.

SUMMARY OF THE INVENTION

The present invention addresses a concern over providing a more efficient reserved communications resource release mechanism in instances where a communications resource (such as a voice channel) is reserved by a mobile switching center node in connection with an attempted incoming call delivery relating to a calling service that is not supported by that mobile switching center node. In the prior art, such a release would occur only after the expiration of a predetermined time out period for effectuating call delivery. In accordance with the present invention, however, the release is ordered nearly immediately following detection by the communications system that the mobile switching center node is unable to support the calling service implicated by the incoming call. Responsive to receipt of the release order, the mobile switching center node releases the previously reserved resource, efficiently rendering the resource available for use in connection with other calls.

In a particular implementation of the present invention concerning the handling of G3Fax/Data calls, a satellite mobile switching center node serving a called mobile station makes a communications resource reservation following a successful paging for the called mobile station. If the satellite mobile switching center node does not support G3Fax/Data calls, a confirmation provided to a visited mobile switching center node concerning the successful paging includes information indicative of the fact that the calling service is not supported. Responsive thereto, the visited mobile switching center node disconnects the incoming call and sends a reserved resource release message to the satellite mobile switching center node. The reserved communications resource is then released by the satellite mobile switching center node and made available for immediate use in connection with other call deliveries.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

A special resources release problem arises with respect to the delivery of certain telecommunications calling services to mobile stations served by switching nodes that do not support one or more of those calling services. An example of one of those telecommunications calling services comprises a G3Fax/Data call. In such a case, the serving switching node receives an indicator that the call at issue implicates a certain one of the telecommunications calling services. Because it does not support that calling service, the serving switching node considers the call as a voice call, and then begins paging for the mobile station to receive a voice call.

If the mobile station responds to the broadcast page, thus locating the mobile station, a communications resource (comprising a traffic channel) over the air interface is reserved to handle a voice call rather than a call for that certain calling service. The mobile station is further marked by the communications system as being busy. The cellular communications system then recognizes, from the paging response message issued by the serving switching node, the call service handling limitations of that node, and appropriately disconnects the call. Until a system determined time out period expires the reserved communications resource is inefficiently retained and the mobile station continues to be marked as busy.

Figure 1:
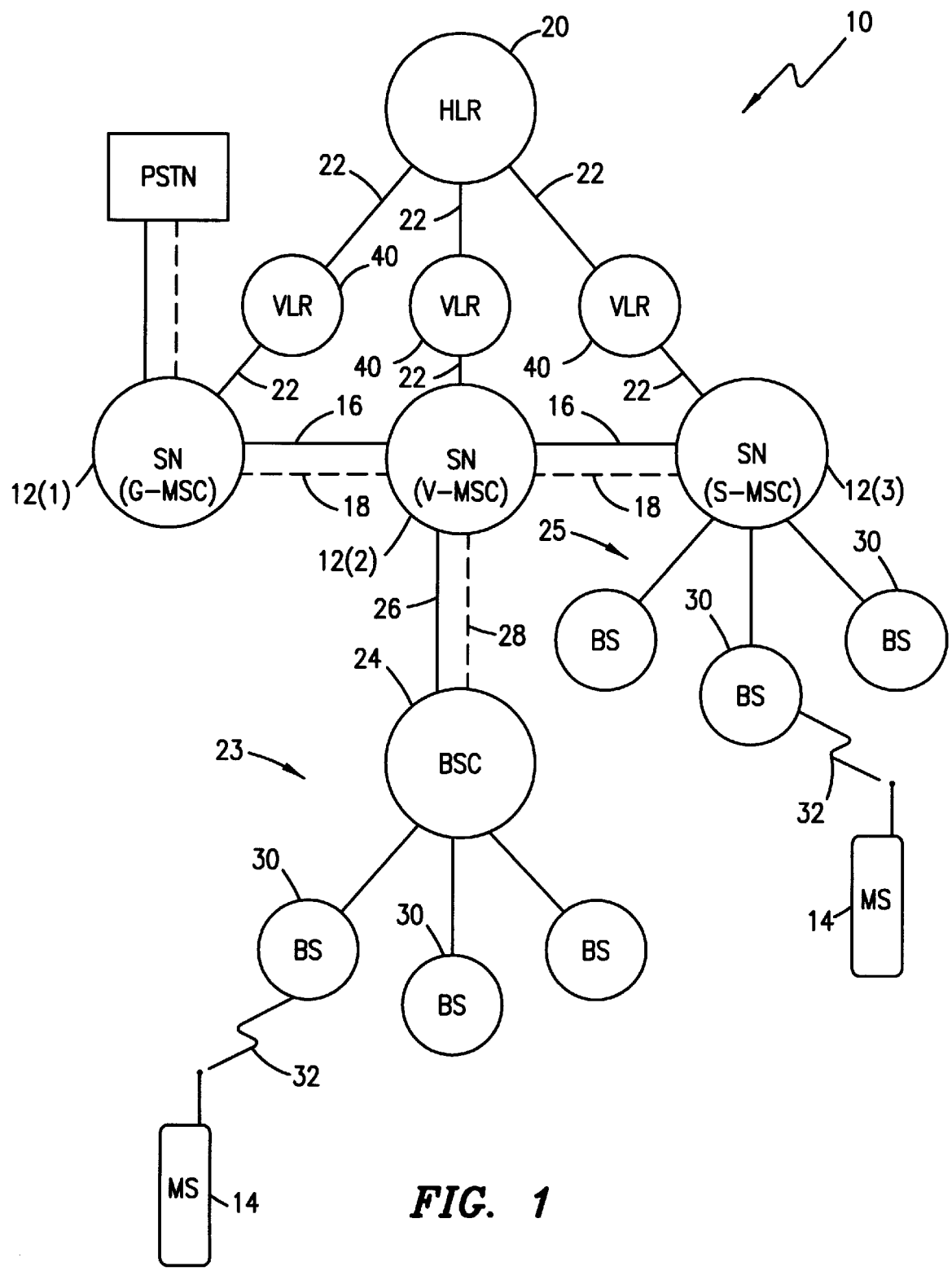
FIG. 1 is a schematic block diagram of cellular communications system.

Reference is now made to FIG. 1 wherein there is shown a schematic diagram of a cellular telephone network including a plurality of interconnected switching nodes (SN) 12. Although only three such switching nodes 12 are shown, it will be understood that the network 10 likely includes many more interconnected nodes. The first through third switching nodes 12(1) and 12(3) may comprise any one of a number of known telecommunications switching devices, including those commonly used and known in the art for providing either digital or analog cellular telephone service to a plurality of mobile stations (MS) 14. The switching nodes 12 are interconnected with each other for communication via both voice trunks 18 (illustrated with broken lines) and signaling links 16 (illustrated with solid lines) providing a Mobile Application Part (MAP) or IS-41/ANSI41 type connection (and/or an ISUP (or R1 or R2) type connection). The voice trunks 18 provide voice and data communications paths used to carry subscriber communications between the switching nodes 12. The signaling links 16 carry command signals between the switching nodes 12. These signals may be used, for example, in setting up and tearing down voice and data communications links over the voice trunks 18 and controlling the provision of calling services to the mobile stations 14.

The switching nodes 12 are also connected to a home location register (HLR) 20 through their associated visitor location registers (VLRs) 40 by means of signaling links 22 providing a known Mobile Application Part (MAP) or IS-41/ANSI41 type connection. The home location register stores information relating to the mobile stations 14 and their subscriptions comprising location information and service profile information. The visitor location registers 40 store substantially the same information as the home location register 20, but only with respect to those mobile stations currently being served by the switching node associated with that visitor location register.

In one cellular system implementation, illustrated generally at 23, the switching node 12 is further connected to at least one associated base station controller (BSC) 24 via both a signaling link 26 and a voice trunk 28. Only one base station controller 24 is shown connected to switching node 12(2) in order to simplify the illustration. The voice trunk 28 provides a voice and data communications path used to carry subscriber communications between the second switching node 12(2) and its base station controller 24. The signaling link 26 carries command signals between the node 12 and its associated base station controller 24. The signaling link 26 and trunk 28 are collectively commonly referred to in the art as the "A interface". The base station controller 24 is then connected to a plurality of base stations (BS) 30 which operate to effectuate radio frequency communications with proximately located mobile stations 14 over an air interface 32. The base station controller 24 functions in a well known manner to control this radio frequency communications operation.

In another cellular system implementation, illustrated generally at 25, the switching node 12(3) is further connected to a plurality of base stations (BS) 30 which operate to effectuate radio frequency communications with proximately located mobile stations 14 over the air interface 32. In this implementation, the functionality provided by the base station controller 24 (see, generally at 23) is instead provided by the switching node 12.

Although direct communications links (signaling and/or trunk) are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in a "virtual" manner as shown in FIG. 1 is therefore by way of simplification of the drawing and the communications relationship between the various included nodes within the network 10.

In the exemplary network implementation illustrated in FIG. 1, switching node 12(1) comprises a gateway mobile switching center (G-MSC), switching node 12(2) comprises a visited mobile switching center (V-MSC) with respect to a certain mobile station 14, and switching node 12(3) comprises a satellite mobile switching center (S-MSC). The gateway mobile switching center node 12 (1) comprises the switching node through which all incoming calls to system served mobile stations are routed. The visited mobile switching center node 12(2) comprises the switching node that the home location register considers to be currently serving that certain mobile station. Finally, the satellite mobile switching center node 12(3) comprises the switching node recognized by the visited mobile switching center node 12(2) as being a potential alternative (neighboring) switching node that may be currently serving the certain mobile station.

Figure 2:
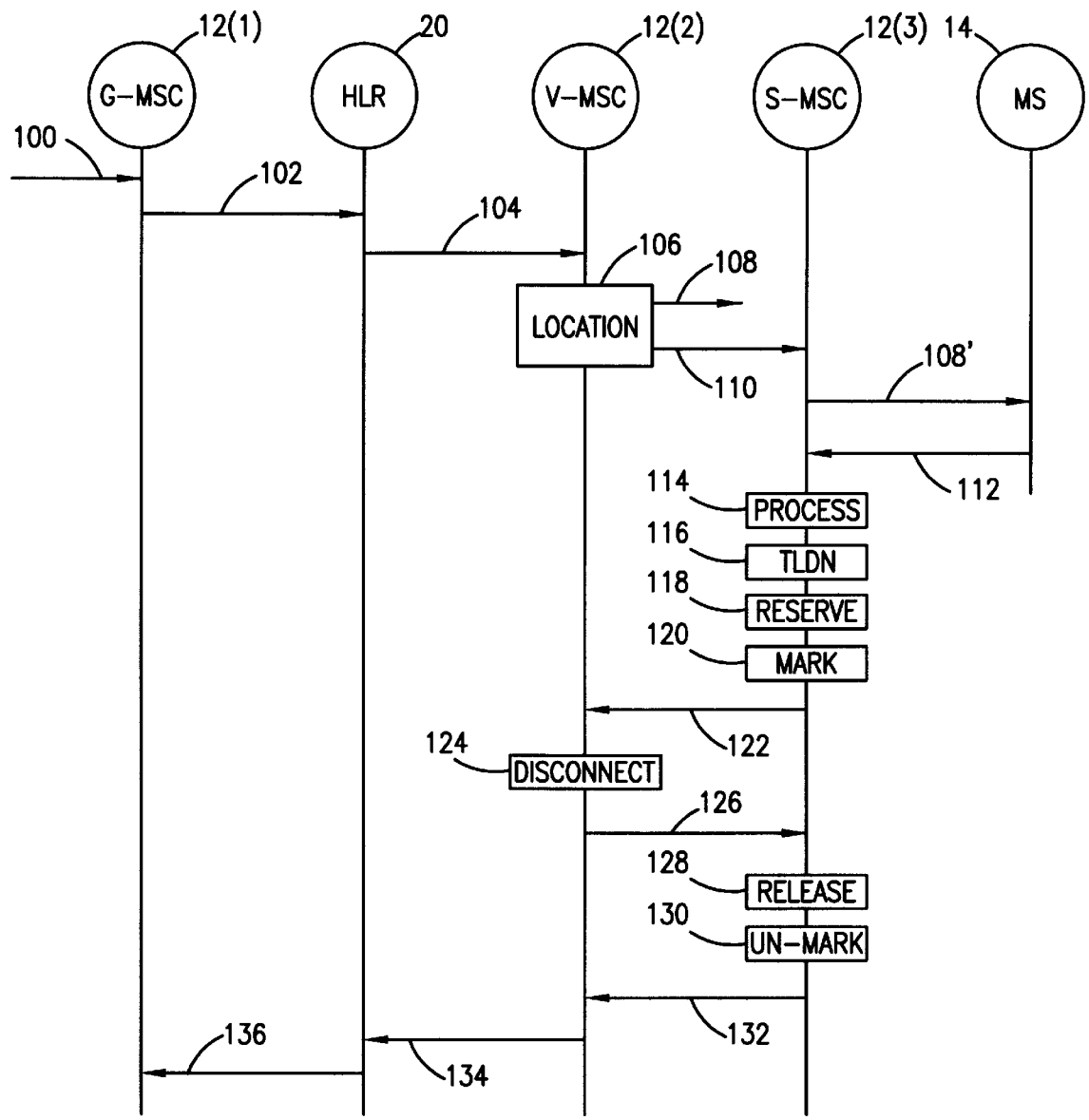
FIG. 2 is a signal flow and nodal operation diagram illustrating resource release in connection with the present invention handling of G3Fax/Data calls.

Reference is now made to FIG. 2 wherein there is shown a signal flow and nodal operation diagram illustrating resource release in connection with the present invention handling of telecommunications calling service calls. A call 100 implicating a certain telecommunications calling service (such as a G3Fax/Data call) dialed to the directory number (B-number) of a mobile station 14 originates from another cellular subscriber or the public switched telephone network (PSTN), and is received at the gateway mobile switching center node 12(1). The gateway mobile switching center node 12(1) then interrogates the home location register 20 with a location request (send routing) message 102. The location request (send routing) message 102 is processed by the home location register 20 to determine the location (i.e., the visited mobile switching center node 12(2)) within the cellular network 10 of the called mobile station 14. Responsive to this interrogation, the home location register 20 contacts the visited mobile switching center node 12(2) for the called mobile station 14 with a routing request (provide roaming) message 104 to prepare for the call. This message 104 includes an indication that the incoming call at issue implicates a certain one of the telecommunications calling services (i.e., the call comprises a G3Fax/Data call). The serving switching node 12(2) then determines in action 106, to some selected degree of granularity, the location (for example, location area) of the called mobile station 14. The action 106 typically comprises broadcasting a paging message 108, addressed to the mobile station 14, by the base stations associated with the visited mobile switching center node 12(2). The action may further comprise the sending of an inter-exchange paging message 110 to the satellite mobile switching node 12 (3). This message 110 also includes an indication that the incoming call at issue implicates the certain calling service (e.g., a G3Fax/Data call). Responsive to message 110, the satellite mobile switching center node 12(3) instructs its base stations to broadcast the paging message 108' addressed to the mobile station 14.

In this call handling scenario, it is assumed that the visited mobile switching center node 12(2) is capable of handling the certain calling service, while the satellite mobile switching center node 12(3) is not capable of handling the implicated type of calling service calls. It is further assumed that the called mobile station 14 is actually currently being served by the satellite mobile switching center node 12(3) instead of the visited mobile switching center node 12(2) as indicated by the data stored in the home location register 20. Accordingly, the visited mobile switching center node 12(2) will not receive a page response to its paging message 108.

The satellite mobile switching center node 12(3) receives the indication in the message 110 that the call at issue implicates the certain calling service (e.g., is a G3Fax/Data call). This node, however, does not handle these types of service calls, and accordingly (perhaps by default) treats the call as a voice call. The page 108' broadcast by the base stations associated with the satellite mobile switching center node 12(3) thus instructs the called mobile station 14 to prepare for a voice call. A page response 112 from the mobile station 14 expecting a voice call is then processed (action 114) by the satellite mobile switching center node 12(3) to make a more precise location determination. In accordance with this determined location, the satellite mobile switching center node 12(3) selects in action 116 an appropriate routing number (for example, a temporary location directory number (TLDN) or a roaming number) for that location. In this instance, the routing number is selected from a plurality of such numbers associated with the satellite mobile switching center node 12(3). The satellite mobile switching center node 12(3) further reserves a communications resource (comprising a voice channel) for a predetermined time period in action 118, and also marks the called mobile station as being busy in action 120.

The satellite mobile switching center node 12(3) then sends an inter-exchange page response message 122 back to the visited mobile switching center node 12(2) indicating that the called mobile station 14 has been found. The message 122 further includes the selected routing number. Also, because the satellite mobile switching center node 12(3) is not capable of handling the certain calling service, the message 122 does not include an indicator (such as a G3Fax/Data indicator) for that calling service. If the message 122 received by the visited mobile switching center node 12(2) does not have the requisite indicator, the visited mobile switching center node assumes that the satellite mobile switching center node cannot support the incoming call 100 implicating the certain telecommunications calling service and causes a call disconnection event (action 124) to occur.

Even though the originally received call 100 has been disconnected, the reserved communications resource (voice channel) from action 118 remains in effect, and the mobile station 14 continues to be marked as busy (see, action 120). While the reservation remains in effect, this valuable communications resource is inefficiently and incorrectly removed from the pool of resources available to handle calls. Furthermore, the mobile station 14 is blocked from either originating or receiving another call. This operating state with respect to the mobile station 14 remains in effect under prior art systems until such time as the predetermined time period for the satellite mobile switching center node 12(3) resource reservation times out. Typically, the reservation times out after about a six second delay.

To provide for more efficient operation of the system in connection with the foregoing calling scenario, the visited mobile switching center node 12(2) immediately responds to the disconnection of action 124 by sending a release seized resources message 126 to the satellite mobile switching center node 12(3). In response to the message 126, the satellite mobile switching center node 12(3) releases the reservation of the communications resource (action 128) and un-marks the busy indication with respect to the mobile station 14 (action 130). The mobile station 14 accordingly then returns back to its idle operating mode. A release confirmation message 132 is then sent from the satellite mobile switching center node 12(3) to the visited mobile switching center node 12(2). A routing request return result message 134, including an indication that the called mobile station is unavailable, is then sent to the home location register 120, with the indication of unavailability forwarded on to the gateway mobile switching center node 12(1) in a location request return result message 136.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A cellular communications system, comprising:
   a visited mobile switching center node believed to be currently serving a called mobile station and having a paging mechanism responsive to an incoming call implicating a certain calling service for paging for the mobile station and issuing an inter-exchange paging message; and
   a satellite mobile switching center actually currently serving the mobile station, the satellite mobile switching center not supporting the implicated certain calling service, and having a paging mechanism responsive to the inter-exchange paging message for paging for the mobile station, and for responding to a paging response by reserving a communications resource for the incoming call and notifying the visited mobile switching center regarding locating of the mobile station; and
   wherein the visited mobile switching center further operates responsive to the locating notification from the satellite mobile switching center to detect the failure of the satellite mobile switching center to support the implicated certain calling service and in response thereto disconnect the incoming call and issues a message instructing the satellite mobile switching center to release the reserved communications resource.

2. The system as in claim 1 further including:
   a home location register storing information indicative of the visited mobile switching center believed to be currently serving the mobile station; and
   a gateway mobile switching center responding to the incoming call by querying the home location register as to the location of the mobile station.

3. The system as in claim 1 wherein the certain calling service comprises a G3Fax/Data service.

4. In a cellular telephone system, a method for handling an incoming call, comprising the steps of:

receiving an incoming call dialed to a mobile station and implicating a certain calling service;

performing a call set-up towards a visited mobile switching center believed to be currently serving the mobile station;

paging for the called mobile station by the visited mobile switching center; issuing of an inter-exchange paging message from the visited mobile switching center;

paging for the called mobile station by a satellite mobile switching center in response to the inter-exchange paging message;

receiving a paging response by the satellite mobile switching center;

reserving by the satellite mobile switching center of a communications resource for use in delivering the call;

notifying the visited mobile switching center concerning locating of the mobile station by the satellite mobile switching center, the notification including information indicating that the satellite mobile switching center does not support the implicated certain calling service;

disconnecting of the incoming call by the visited mobile switching center in response to the notification; and issuing of an order by the visited mobile switching center to the satellite mobile switching center in response to the notification to effectuate an immediate release of the reserved communications resource.

5. The method as in claim 4 wherein the certain calling service comprises a G3Fax/Data service.

6. In a cellular telephone system having a visited mobile switching center and a satellite mobile switching center, and utilizing a page before routing call delivery procedure, a method for terminating a call set up before delivery, comprising the steps of:

reserving of a communications resource by the satellite mobile switching center for use in delivering an incoming call implicating a certain calling service to a mobile station;

determining by the visited mobile switching center that the satellite mobile switching center cannot support the certain calling service;

disconnecting of the incoming call by the visited mobile switching center in response to the determination that the certain calling service is not supported; and releasing of the reserved communications resource by the satellite mobile switching center immediately following the determination that the certain calling service is not supported.

7. The method as in claim 6 wherein the step of releasing comprises the steps of:

transmitting of a release command message from the visited mobile switching center to the satellite mobile switching center immediately following the determination that the certain calling service is not supported; and releasing of the reserved communications resource by the satellite mobile switching center in response to the release command message.

8. The method as in claim 6 wherein the step of determining comprises the steps of:

receiving a message by the visited mobile switching center from the satellite mobile switching center that the mobile station has been located, the received message including information indicative of the fact that the satellite mobile switching center cannot support the certain calling service; and identifying from the included information in the received message that the certain calling service is not supported.

9. The method as in claim 6 wherein the calling service comprises a G3Fax/Data service.

* * * * *

UNITED STATES PATENT AND TRADEMARK OFFICE
CERTIFICATE OF CORRECTION

PATENT NO : 6,131,026

DATED : October 10, 2000

INVENTOR(S) : Eduardo Teodoro Sanchez Badillo

It is certified that error appears in the above-identified patent and that said Letters Patent are hereby corrected as shown below:

Column 1, line 8  Replace "f or"
With --for--

Column 3, line 14  Replace "network"
With --network 10--

Column 3, line 41  Replace "register"
With --register 20--

Column 6, line 54  Replace "disconnect"
With --disconnects--

Signed and Sealed this

First Day of May, 2001

Attest:

NICHOLAS P. GODICI

Attesting Officer   Acting Director of the United States Patent and Trademark Office